US012484609B2

(12) United States Patent
Balçik (10) Patent No.: US 12,484,609 B2
(45) Date of Patent: Dec. 2, 2025

(54) SYSTEM HAVING A ROBOTIC FUNCTIONALITY FOR A DIVISION PROCESS OF A PRESSED AND CASED TOBACCO BALE INSIDE ITS ORIGINAL CASE INTO 2 OR MORE PIECES (71) Applicant: Adeba Mühendislik Danişmanlik Halkla Ilişkiler Insaat Sanayi Ve Ticaret Anonim Şirketi, Izmir (TR)

(72) Inventor: Hasan Engin Balçik, Izmir (TR)

(*) Notice: Subject to any disclaimer, the term of this patent is extended or adjusted under 35 U.S.C. 154(b) by 0 days.

(21) Appl. No.: 18/852,663

(22) PCT Filed: Mar. 22, 2023

(86) PCT No.: PCT/TR2023/050270
§ 371 (c)(1),
(2) Date: Sep. 30, 2024

(87) PCT Pub. No.: WO2023/191744
PCT Pub. Date: Oct. 5, 2023

(65) Prior Publication Data
US 2025/0221443 A1    Jul. 10, 2025

(30) Foreign Application Priority Data

Mar. 31, 2022  (TR) ............... 2022/005091

(51) Int. Cl.
*A24B 3/06* (2006.01)
*B65G 47/90* (2006.01)

(52) U.S. Cl.
CPC .............. *A24B 3/06* (2013.01); *B65G 47/901* (2013.01); *B65G 2203/0258* (2013.01)

(58) Field of Classification Search
CPC .......... A24B 3/06; A24B 3/07; B65G 47/901; B65G 2203/0258; B26D 2007/322; B26D 7/32; B26D 3/28; Y10T 225/329
(Continued)

(56) References Cited

U.S. PATENT DOCUMENTS 2,729,885 A * 1/1956 Wahl ................... B65B 69/0033
414/412
2,736,477 A * 2/1956 Krebs ..................... B65B 67/04
53/260
(Continued)

FOREIGN PATENT DOCUMENTS

CN         113232032 A  *  8/2021  .............. B25J 15/00
DE   102007033922 A1  *  1/2009  .............. B65H 3/32
(Continued)

OTHER PUBLICATIONS

International Search Report for corresponding PCT/TR2023/050270 dated Sep. 12, 2023.
(Continued)

*Primary Examiner* — Gregory W Adams
(74) *Attorney, Agent, or Firm* — Egbert, McDaniel & Swartz, PLLC (57) ABSTRACT A system for a division and separation process of a full-size tobacco bale through its horizontal direction without removing it from its original case, positioning of the upper piece into another empty case and completing all sub-processes with compact solutions. The mechanical features of process used during the division of tobacco bale inside case are the folding of case side flaps, ensuring of holding them steadily during entire process, measuring the incoming case weight, creating free space in between case side walls and tobacco bale, travels of dividing arms in to the free space, rotation and pulling up the section of the tobacco bale outside and releasing of this upper section into upcoming empty case.

10 Claims, 11 Drawing Sheets

(58) Field of Classification Search
USPC ......... 83/468.6; 53/475, 251, 531, 537, 539,
53/540; 414/795.9, 796, 796.2, 416.01,
414/416.02, 416.05, 416.07, 416.1;
294/106, 81.61, 104
See application file for complete search history.

(56) References Cited

U.S. PATENT DOCUMENTS

| | | | | |
|---|---|---|---|---|
| 3,716,148 | A * | 2/1973 | Varga | D01G 7/04 414/796.9 |
| 3,889,442 | A * | 6/1975 | Grahn | B65B 43/38 414/412 |
| 3,922,778 | A * | 12/1975 | Aalpoel | B65B 69/0033 83/425.2 |
| 5,069,019 | A * | 12/1991 | Lodewegen | B65B 25/065 53/247 |
| 5,398,479 | A * | 3/1995 | Diete | B65B 35/36 53/260 |
| 5,664,931 | A * | 9/1997 | Brugger | B65H 1/30 294/81.61 |
| 6,334,447 | B1 | 1/2002 | Coleman et al. | |
| 6,446,633 | B2 * | 9/2002 | Coleman | A24B 3/06 414/785 |
| 7,174,695 | B2 * | 2/2007 | Porter | B65B 69/0025 53/399 |
| 7,694,492 | B2 * | 4/2010 | Van Ballegooijen | B65B 23/02 53/473 |
| 8,172,498 | B2 * | 5/2012 | Enenkel | B65G 65/23 414/811 |
| 2021/0331327 | A1 * | 10/2021 | Lee | B25J 15/0253 |
| 2023/0278231 | A1 * | 9/2023 | Lee | B25J 15/0052 294/87.1 |

FOREIGN PATENT DOCUMENTS

| | | |
|---|---|---|
| EP | 0101271 A1 | 2/1984 |
| EP | 0582139 A1 | 2/1994 |
| EP | 0641523 A1 | 3/1995 |

OTHER PUBLICATIONS

Written Opinion of the International Searching Authority for corresponding PCT/TR2023/050270 dated Sep. 12, 2023.

* cited by examiner

SYSTEM HAVING A ROBOTIC FUNCTIONALITY FOR A DIVISION PROCESS OF A PRESSED AND CASED TOBACCO BALE INSIDE ITS ORIGINAL CASE INTO 2 OR MORE PIECES

TECHNICAL FIELD

This invention relates to a system that reveals a new process, using a special robotic mechanism, enabling tobacco bales being delivered as compressed and in a single case size (C48), are simply divided into two equal pieces. This process equipment enables factories to use a greater number of different tobacco types/grades within the same cigarette blend, gives great flexibility to product designers to exchange different raw materials more easily, supports product quality consistency works while generating great cost reduction opportunities for cigarette factories.

The invention relates in particular to a tobacco bale dividing system used for dividing compressed tobacco bales inside its original case, where the folded side flaps of the case are being expanded outwards, creating free space in between case & tobacco bale, allowing the robot arms travel down to desired depth inside the case. And then, cutting knives over these arms are rotated 90° in the same level, where the upper part of this tobacco bale remains over the cutting arms and being lifted out of the case with main robotic system movement and finally re-filled into the upcoming empty box with the same sequence.

PRIOR ART

Tobacco is the raw material used in the cigarette industry. Tobacco blends used in cigarettes are created by blending different types of tobacco collected from all around the world with varying characteristics. Typically, raw material supply factories prepare these tobaccos in standard boxes (C48 type box) with compressed form and ship them to cigarette factories. Almost all cigarette factories receive each raw tobacco grades in this standard case for logistic cost optimization as well as process standardization purposes. And then, these tobacco grades are fed into the cigarette factory production process as whole bales. On the other side, tobacco is an agricultural product and changes its important characteristic values depending on each year climate conditions. As the incoming raw tobacco grade's characteristic and their important parameters (like tar, nicotine etc.) are mostly changing seasonal base, responsible product engineers in cigarette factories have to continuously control blend formula, make many tests and replace tobacco grades to be able to remain within the strict rules of cigarette industry while maintaining same smoking quality for cigarette users. This challenging condition shall be only eased by the usage of more tobacco grades within the same cigarette blend and several big cigarette manufacturers have been already initiated studies towards this solution, requesting to feed half weight tobacco grades to their process and increase the number of different tobacco grades (from max. 30 up to 60 grades) This invention is aiming to divide incoming tobacco grades into half weight/size inside its original case with robotic functionality.

Figure 19:
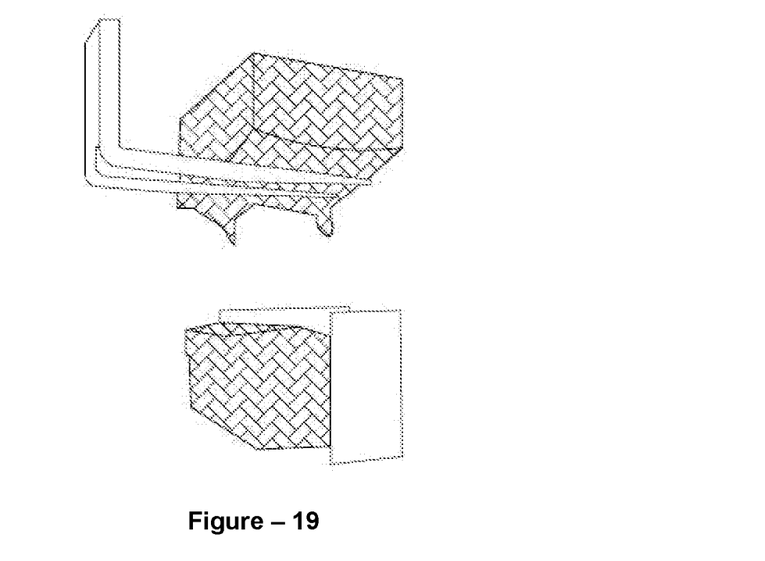
FIG. 19; The visual shows how the manual operation is handled in the known technique.

There are multiple methods known in the prior art. The simplest method is manual operation, as shown in FIG. 19. The boxes are lifted by a forklift with a side attachment, carried over a weighing unit to be initially taken out of its box and to measure its initial weight. And then, another forklift with knifes divides tobacco bale into half by entering its knifes from the almost the centre of tobacco bale. Then, knifes moves up and lifts upper part of the bale and carries it onto another weighing unit. Operator pushes it manually onto 2nd weigher and starts to carry tobacco in between cases to equally divide it. Later on, these half tobacco bales are transferred onto metal pallets and then moved to storage racks. This widely known and applied method has several disadvantages. It causes a significant amount of product loss by dropping a large amount of the product onto the ground and rendering it unusable. The risk of foreign objects getting mixed into the product increases, and the working environment poses a high level of occupational safety risks for the employees. Additionally, this type of work model results in a significant increase in labour costs for factories.

Figure 20:
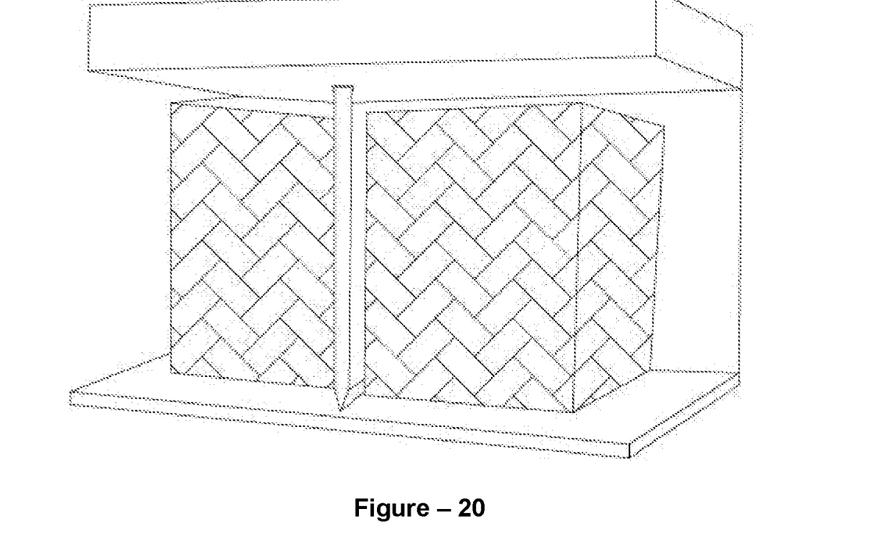
FIG. 20; The visual shows how the vertical dividing process is realised in the known technique.

One the other methods is a semi-automatic system to be used. This system includes various conveyors, a vertical cutting blade, pre-labelled pallets, and racks that store the pallets. Tobacco bales taken out of its boxes and are placed onto a belt conveyor and then transferred to the under a dedicated vertical cutting unit. This unit divides the tobacco bale vertically into half, and then pushes the half tobacco bales onto pre-labelled metal pallets carrying product descriptions. The process of dividing the tobacco bale vertically can be seen in FIG. 20. These half tobacco bales on pallets are then carried and stored on shelves with a forklift. This method also creates serious problems similar to manual operation, such as product losses, the possibility of foreign material mixing into the open products during storage, and the risks of mixing the products in the final blend, while requiring significant initial investment cost and the necessity of having the entire operation within the production facility instead of the factory's warehouses.

In another known technique is the fully automatic version of process as there is also used a vertical dividing equipment similar to semi-automatic version but includes extra robotic equipment that stores tobacco bales in high-capacity racks and a complex dedicated software that controls tobacco bales for loading and unloading from system. As this solution leads to a greater number of half bales are stored on racks in long durations, tobacco bales are negatively affected from climate conditions inside shopfloor losses moisture inside that forces factories to operate dedicated air conditioning units. Therefore, these systems increase operational expenses with significant energy consumption necessity.

In the literature research conducted, European patent document EP0641523A1 was encountered. The document describes a method and machine for cutting tobacco bales. A guillotine-like blade that moves up and down and works vertically is used in the machine to cut the bales. However, as with the invention described in the specification while the dividing process is fully different as horizontal dividing instead of vertical dividing, the document states that it is not possible to take half of the tobacco bale from inside the box and perform the packaging process of the separated two bale pieces in two separate boxes.

Tobacco grades are prepared, transported and stored in standard C48 sized cases for almost entire tobacco industry. These cases have labels indicating the type/grade of tobacco inside. The biggest disadvantage of the known techniques is that the bales have to be removed from original cases and to be stored on open shelves after being divided. The invention described in the specification involves a horizontal division process where only removing upper half from its original case and placing it into next case immediately. No details have been found in the known technique that can perform this function and provide the following advantages.

The Purpose of Invention

The invention is a system that overcomes the disadvantages of the prior art technique and enables the top half of a tobacco bale in a case to be horizontally cut and taken out, placed into an empty case, that leads to division process of two or more pieces are packed in cases.

The purpose for this invention is; to establish a compact system that enables tobacco bales that is delivered in compressed base inside cases to be easily and quickly divided into at least two pieces.

The purpose for this invention is; to achieve minimum labour and manual work load requirements during daily operation.

The purpose for this invention is; to ensure minimum investment amount is required for such new process having many advantages available.

The purpose for this invention is; to ensure that tobacco bales can be automatically divided into equal parts with a weight accuracy of max. ±%3 at the system output, regardless of the initial weight of the bales.

The purpose for this invention is; to minimize product loss during all dividing and storing operations.

The purpose for this invention is; to eliminate the possibility of foreign matter entering to the tobacco bale during division and subsequent handling processes.

The purpose for this invention is; to enable the divided parts to be more durable and sturdier within the cases by dividing the tobacco bale horizontally instead of vertically, and to provide a fully compatible supply chain system to the existing process equipment in cigarette factories.

The purpose for this invention is; to prevent the need for new special pallets and shelving systems for storing the split tobacco bales.

BRIEF EXPLANATION OF FIGURES

The invention will be described with reference to the accompanying drawings, so that the features of the invention will be clearly explained. However, the purpose is not to limit the invention to these particular arrangements. On the contrary, it is intended to encompass all alternatives, modifications, and equivalents that may be included within the scope of the claims defining the invention. The details shown are for the purpose of illustrating preferred embodiments of the invention and should be understood as being presented for the purpose of providing the most useful and readily understandable definition of the methods of shaping the invention, as well as the rules and conceptual features of the invention. In these drawings;

REFERENCE NUMBERS

1. First Conveyor
2. Second Conveyor
3. Third Conveyor
   3.1. Case long side flaps steady folding & holding metal pieces
   3.2. Case short side flaps steady folding metal pieces
      3.21 Slope
   3.3. Case front stopper as movable item on the conveyor
   3.4. Case lateral guiding unit as movable item on the third conveyor
   3.5. Weight measurement element on the third conveyor
   3.6. Case Up-down driving unit on the third conveyor 4. Forth conveyor
   4.1. Weight measurement element on the fourth conveyor
5. Tobacco bale dividing robot
   5.1. Case long side flaps opening unit
   5.2. Carriage system main process plate
   5.3. Main carriage system
   5.4. Dividing arms
   5.5. Dividing arms driving servo motor
   5.6. Counter pressing plate
   5.7. Purge air control valve
   5.8. Weight measurement data display unit
6. Fifth conveyor
   6.1. Strip channels
7. Sixth conveyor
8. Seventh conveyor
   A. Case
   B. Full size tobacco bale
   C. Tobacco bale upper section
   D. Tobacco bale lower section
   E. Strap
   X, Y movement directions

DETAILED EXPLANATION OF THE INVENTION

The invention subject of tobacco bale dividing system is described in this detailed explanation only for the purpose of better understanding the subject, and with no restrictive effect, using examples. The specification describes a system that involves horizontal dividing & taking apart the upper half of a full-size tobacco bale (B) inside a case (A), transferring it into another empty case (A), and as conclusion, dividing 1 full case into two cases with half amount product (A) to be packed, thereby allowing a tobacco bale (B) to be split between two cases (A).

Figure 1:
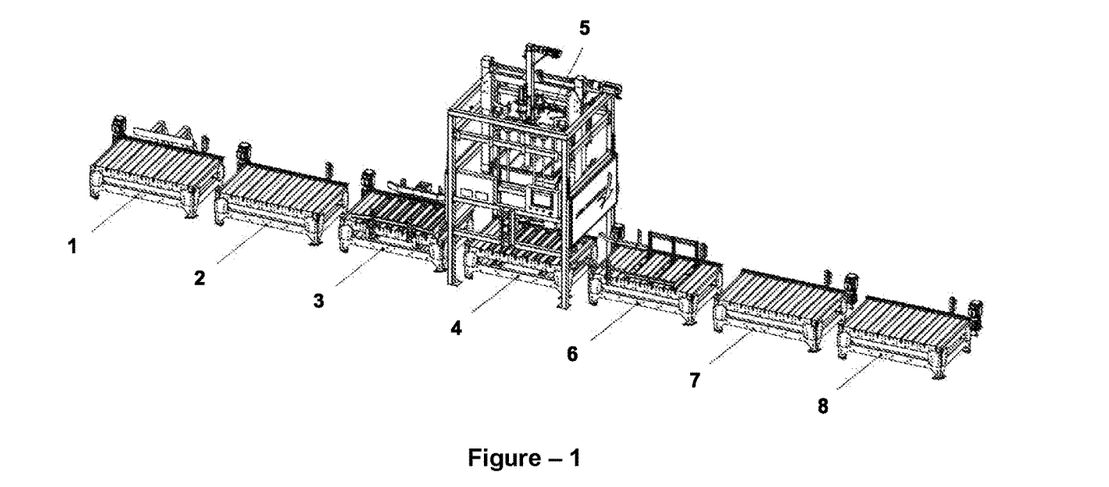
FIG. 1; A perspective view of the entire system subject of the invention.

In FIG. 1, the general view of the tobacco bale dividing system is given. Accordingly, the system consists of seven conveyors and a tobacco bale dividing robot (5) positioned on the conveyor located in the centre.

In this system, the first conveyor (1) and the second conveyor (2) are conveyors with 2 cases (A) on top, and only the first case where a full tobacco bale (B) is fed into system.

The third conveyor (3) is the section where the preparation processes of the case (A) are carried out prior to transfer to the tobacco bale dividing robot (5). On the third conveyor (3), the strips (E) are removed, covers of the case (A) are opened, some extra metal flap guiding pieces are placed on the long and short flaps of the case (A) and finally full case weight is measured.

The Fourth conveyor (4) is the section where the tobacco bale (B) inside the case (A) is horizontally divided by the tobacco bale dividing robot (5) as the upper tobacco bale (C) and the lower tobacco bale (D) pieces.

The sixth conveyor (6) serves as an exit conveyor for the case (A) where the lower tobacco bale (D) of the tobacco bale (B) with the upper half removed is transferred. In this section, the case side flaps steady folding & holding parts (3.1 & 3.2) are removed from the case (A), its flaps are closed, and its new strips (E) are stretched for re-packaging.

The Sixth (7) and Seventh (8) conveyors are the storage conveyors at the system output.

Figure 2:
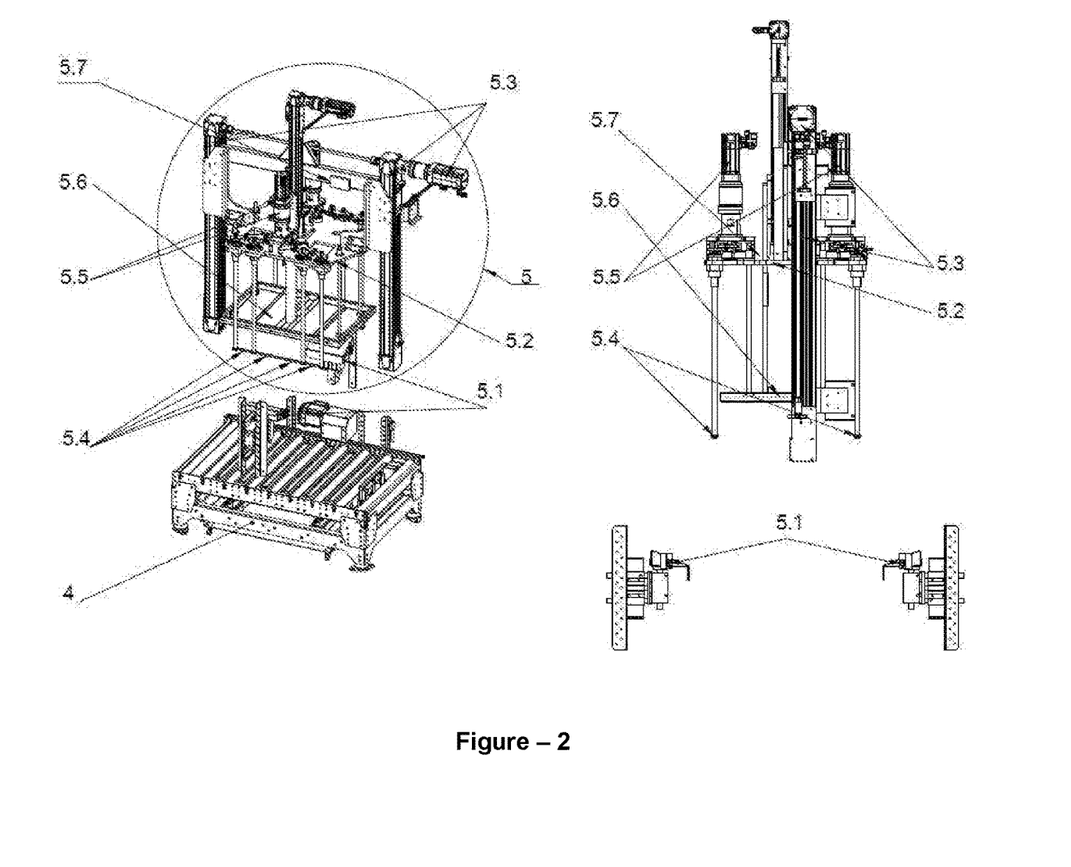
FIG. 2; Perspective & exploded views of the tobacco bale division robotic unit referred in this invention.

In FIG. 2, the details of the tobacco bale dividing robot (5), which is the main section that performs the task in the invention, are given. The tobacco bale dividing robot (5) divides the full-sized tobacco bale (B) inside the box (A) into two or more parts horizontally, obtaining the upper tobacco bale (C) and the lower tobacco bale (D). Although the current desired condition in the industry is to divide the tobacco bale (B) into two equal parts, the tobacco bale dividing robot (5) has the ability to divide the full-sized tobacco bale (B) into more than two pieces. At the same time, the tobacco bale dividing robot (5) can also divide the full-sized tobacco bale (B) into unequal pieces. The operating parameters shall be selected on preference and requirements.

In the tobacco bale dividing robot, which is subject of the invention (5), there are case long flaps opening arms (5.1) that open the both sides of the case (A) in which the full-size tobacco bale (B) is located. These arms (5.1) pass through the claws in the case long side flaps holding parts (3.1) on the case (A) and provide the free space in between long sides of the case (A) and the cutting arms (5.4) that divide the upper half of the full-size tobacco bale (B) inside the box (A) can enter into the box (A).

In the tobacco bale dividing robot (5), the dividing arms (5.4) are placed on a main carrier system table (5.2) where they can rotate around their axes. The dividing arms (5.4) can rotate gradually from its zero/reference position, where it is steadily hold as parallel to the long side of the case (A), up to 90° where it is perpendicular to the case long sides. The rotation movement of the dividing arms (5.4) is driven by the dividing arm servo motors (5.5), where they are located on the main carrier system table (5.2). The main carrier system table (5.2) moves vertically on the main carrier system (5.3). In the tobacco bale dividing robot (5), there is a servo motorized pressing group (5.6) to apply counter pressure to the divided upper half tobacco bale vertically. In addition, in the tobacco bale cutting robot (5), there is an air control valve (5.7) blowing air onto the pressing plate (5.6) to prevent tobacco particles from being spread around/outside box while being divided into two.

Figure 3:
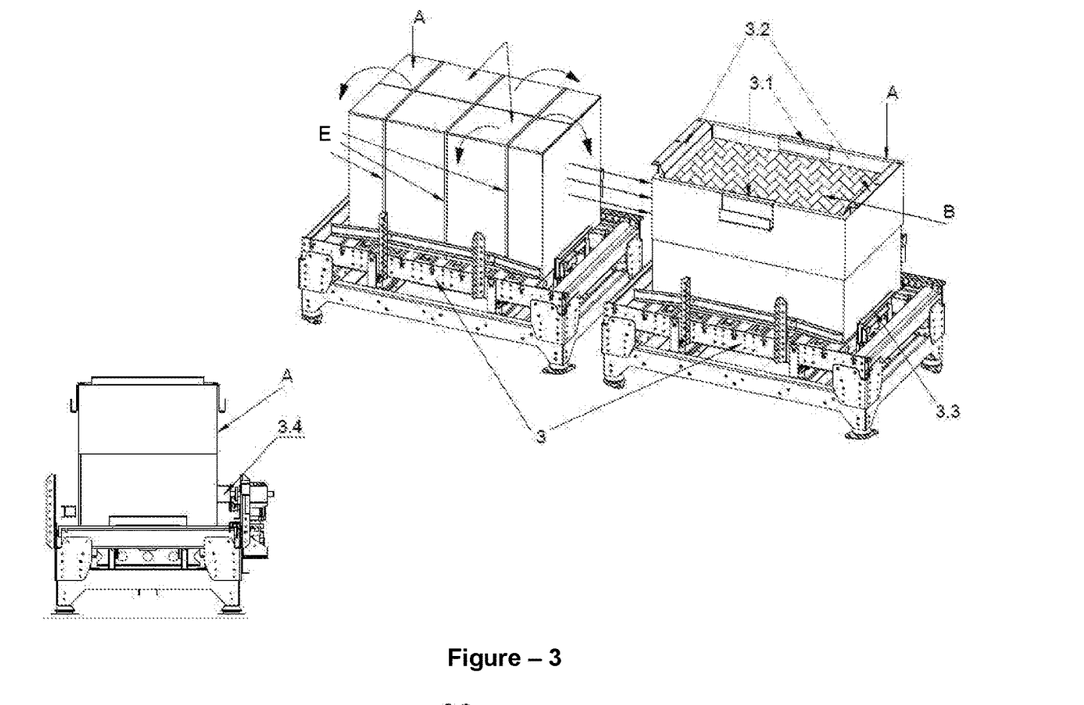
FIG. 3; The visuals of how the manual preparation steps are applied to the tobacco case on conveyor number three.
Figure 4:
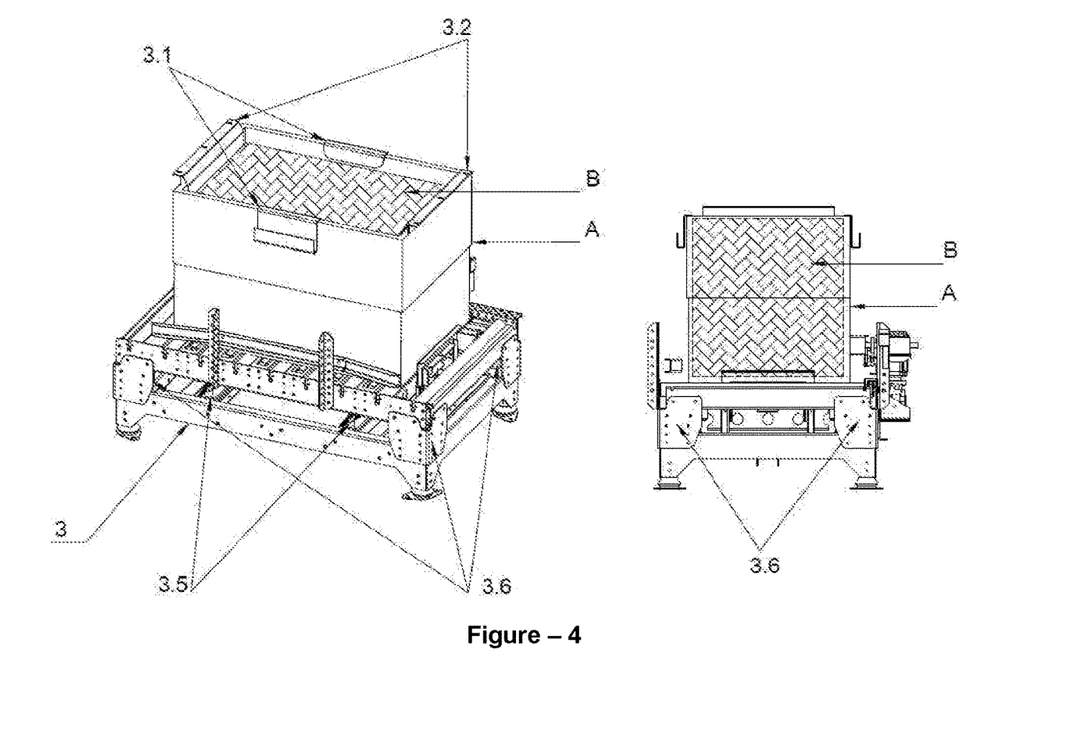
FIG. 4; Additional visuals of how the automated processes are applied to the tobacco case on conveyor number three.
Figure 6:
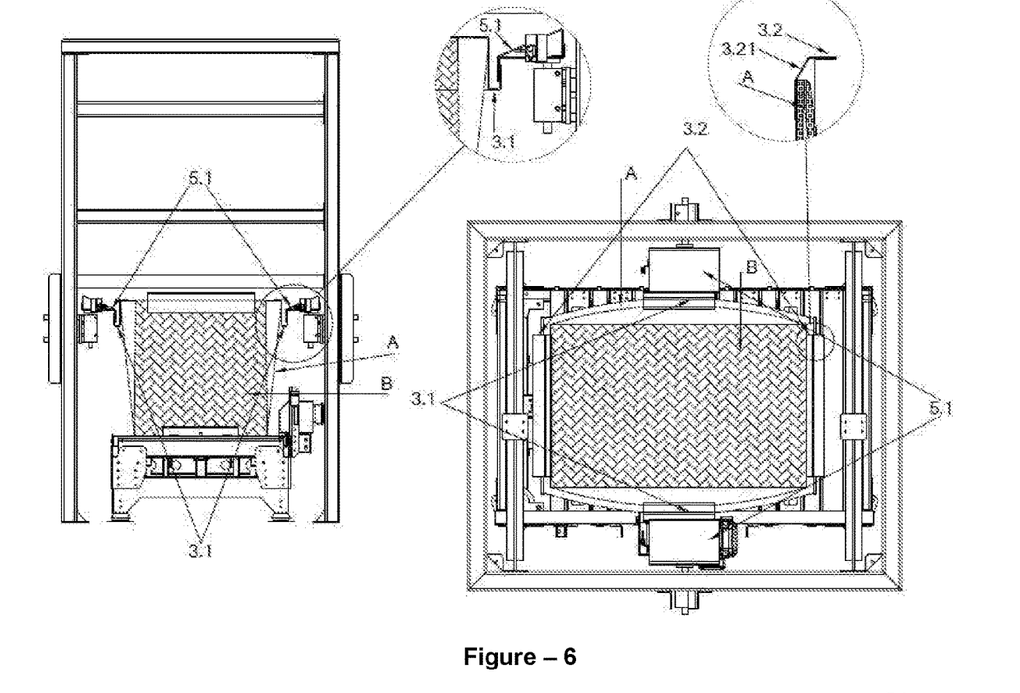
FIG. 6; The visuals that show the long sides of the case being pulled outwards to allow the dividing arms of the robot to enter in between case & tobacco bale.

FIGS. 3 and 4 show the details of the manual and automatic preparation operations performed on the third conveyor (3) in the system. First, an operator removes the strips (E) of the case (A) and opens/folds all case flaps on this third conveyor (3). Then, the same operator places case flaps steady holding parts (3.1 & 3.2) on the long and short flaps of the case (A). The long side holding parts (3.1) is to be considered as having two functions: first, to ensure that the long side flaps of the case remain fully open & steady, and the second, to be associated later on with the tobacco bale cutting robot (5) and the case long side opening arms (5.1) on the fourth conveyor (4). The case long side opening arms (5.1) extends the long sides of the case (A) by applying a pulling force, creating enough space for the cutting arms (5.4) to enter in between. The box short side holding parts (3.2) is used to prevent the short sides of the box from flexing or bending during the expansion of the long side of the case (A). Additionally, the box short side fixation attachment (3.2) has a sloping surface (3.2.1) to facilitate the placement of the full-size tobacco bale (B) inside the empty box (A). (As shown in FIG. 6)

In the third conveyor (3), there is a weight measurement system (3.5) that measures the weight of the case (A). There are 4 (four) pieces of this measurement system located on all around third conveyor. In the corners of the third conveyor (3), there are also case lifting items (as up-down movement) (3.6) that can move the case (A) in the vertical direction.

In addition, there is a front stopper unit (3.3) as moveable that stops the case (A) from the front/short side and the case lateral guiding unit (3.4) that directs and positions the case (A) from its long sides right after transferred onto the third conveyor (3).

Figure 5:
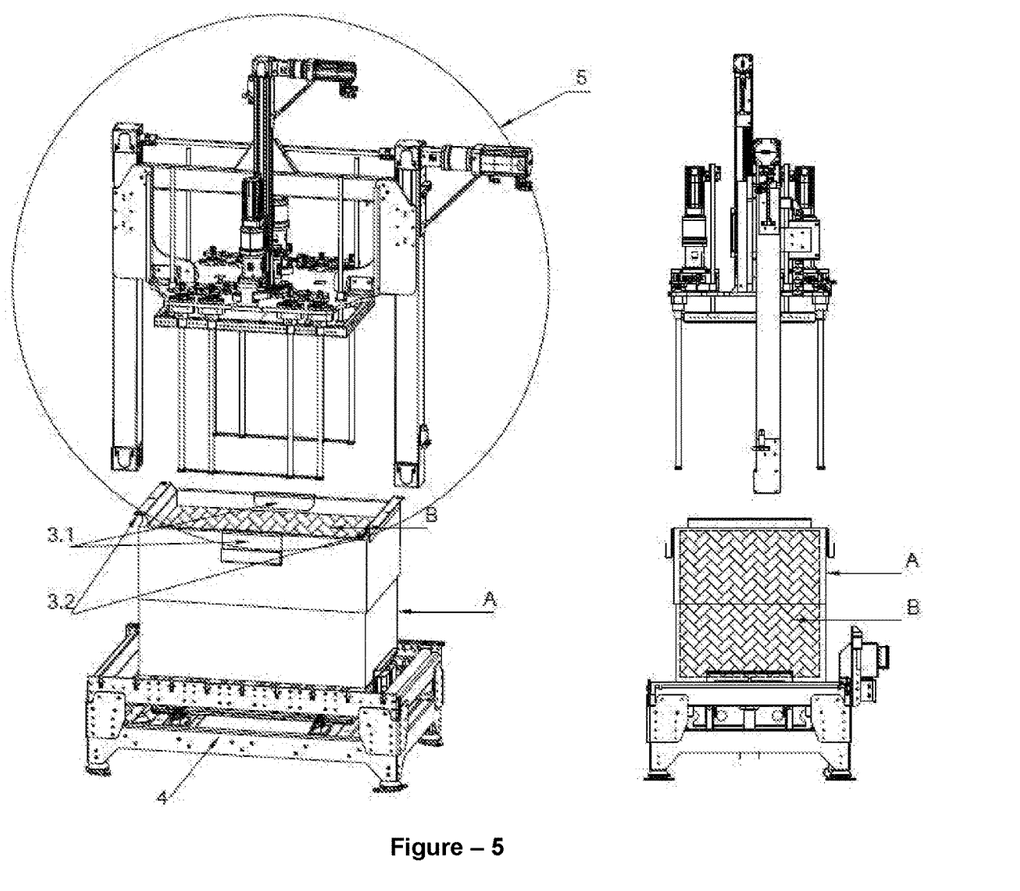
FIG. 5; The visuals where the tobacco bale inside original case with the top lids are open and is positioned underneath the dividing robot (at number 4 on the conveyor).

In FIG. 5, the case (A) has been transferred from the third conveyor (3) to the fourth conveyor (4) and positioned under the tobacco bale dividing robot (5).

Figure 7:
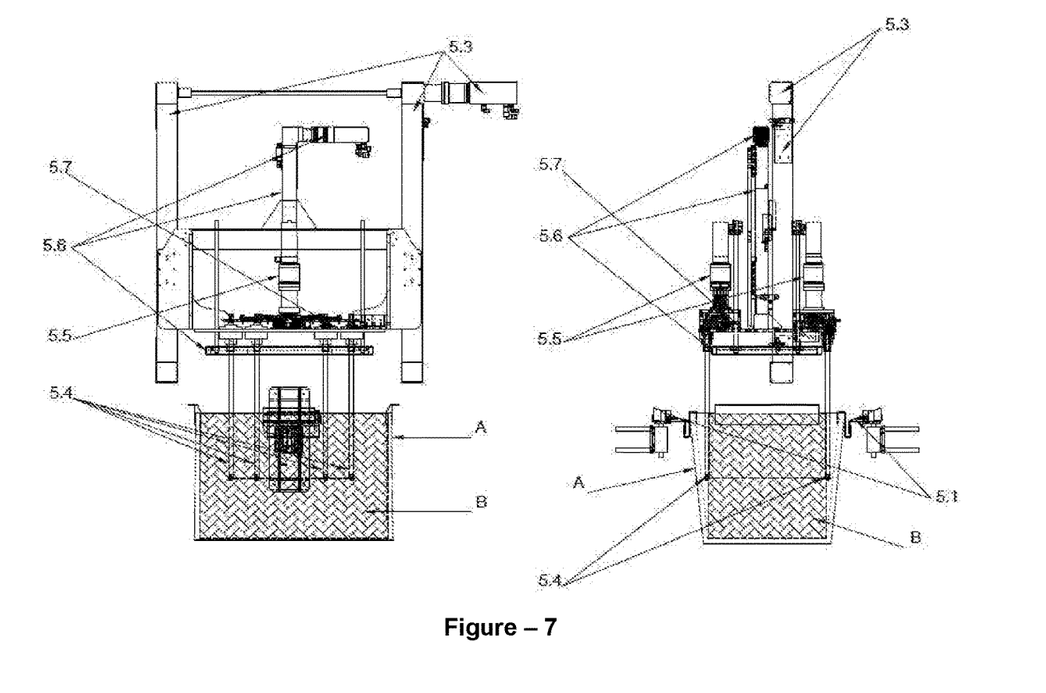
FIG. 7; The visual shows that the arm of the dividing robot moves downwards in that free space up to the level determined by the automation system.

In FIGS. 6 and 7, case long side opening arm (5.1) is extracting the long sides of the case (A) by applying pulling power to the case long side holding parts (3.1). As aiming to, when the main conveying system (5.2) moves downward in the vertical direction, the cutting arms (5.4) can enter through the gap in between the case (A) side walls and the full-size tobacco bale (B).

Figure 8:
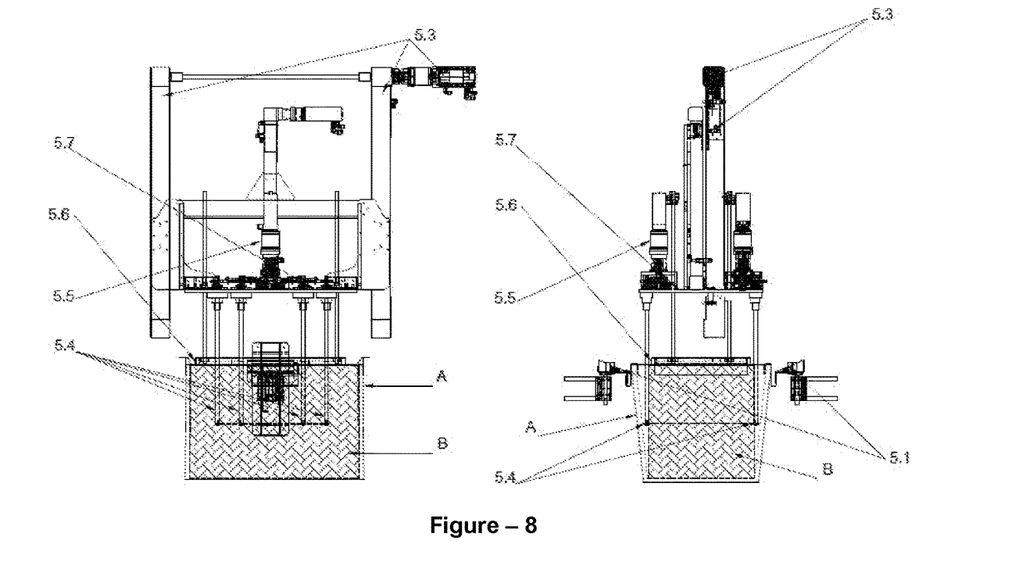
FIG. 8; The visual shows that how the counter balancing, plate goes down in order to hold tobacco bale in new case in proper shape.

Initially, the dividing arms (5.4) move forward until half the size of the full-size tobacco bale (B), and then a low-intensity pressure is applied to the upper surface of the full-size tobacco bale (B) with the counter pressure plate (5.6), as seen in FIG. 8. The dividing (5.4) arms are 4 (four) pieces as set. This quantity shall be less or more but for this separation method, based on test results, represented as the most effective way for proper division.

In FIG. 7, the dividing arms (5.4) are completely closed. When the dividing arm motor (5.5) rotates these cutting arms (5.4) on the main support system table (5.2), the cutting arms (5.4) move into the full-size tobacco bale (B).

The most critical stage of the technique as the process of dividing the full-sized tobacco bale (B) is the gradual rotation movement of the dividing arms (5.4). To better understand this gradual movement; as example, when the cutting arms (5.4) rotates into the full-sized tobacco bale (B) by 10°, they stop and right after that, all system as the main carriage unit (5.3) moves upwards and downwards for approximately 10 cm in order to partially separate and weaken the stickly tobacco pieces of the full-sized tobacco bale (B). Then, the cutting arms (5.4) rotate again by another 10° and this cycle continues until the rotation of the cutting arms (5.4) reaches until 90° angle. As a result of this process, the system divides the full-sized tobacco bale (B) into the upper tobacco bale (C) and the lower tobacco bale (D) properly & reliably.

Figure 9A:
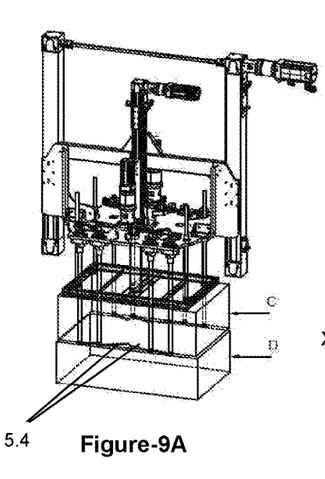
FIG. 9A, 9B, 9C, 9D, 9E; The consecutive visuals show the main dividing robot and how the robot arms operate with short distances & intervals with the sequence of limited rotation of the arms and then all arms movement up-down that fully facilitates the separation of the pressed tobacco leaf from each other.
Figure 9B:
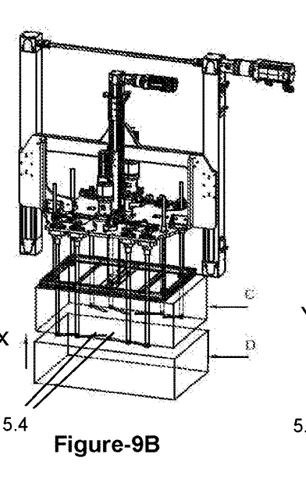
Figure 9C:
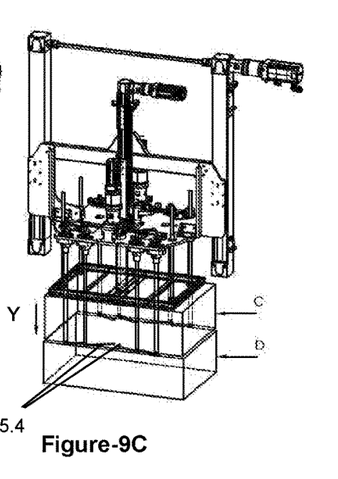
Figure 9D:
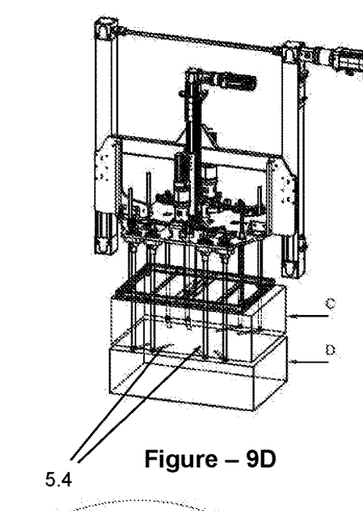
Figure 9E:
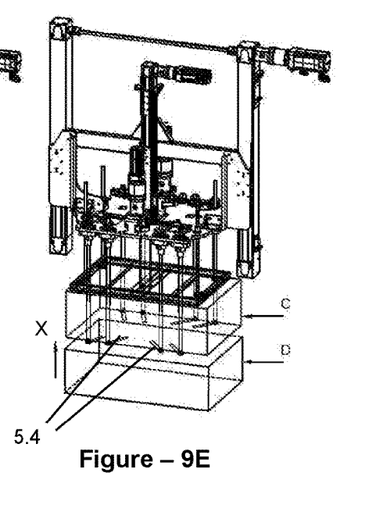
Figure 10:
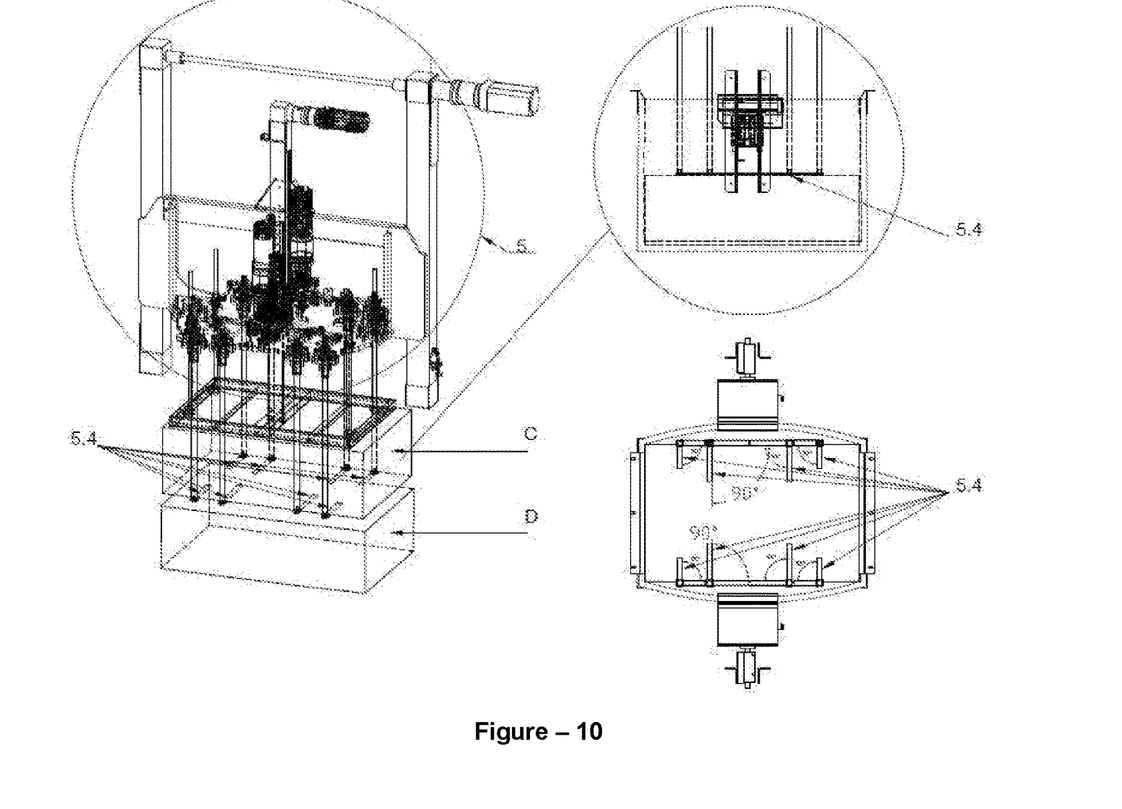
FIG. 10; The visual shows that the tobacco bale is divided into two pieces after the full 90 degree turn of the cutting arm is completed.

The detailed process explanation of the previous paragraph is shown in detail in FIGS. 9A, 9B, 9C, 9D, and 9E. Firstly, the dividing arms (5.4) rotate into the full-size tobacco bale (B) (FIG. 9A). This rotation is greater than 0° but less than 30° (preferably 10°). When the dividing arms (5.4) rotation is completed, the main carrier system (5.3) moves in the X direction (FIG. 9B) and then moves in the Y direction (FIG. 9C). The main carrier system's (5.3) up and down movement repeats with each movement right after each dividing arms (5.4) rotation inside the full-size tobacco bale (B) at an angle greater than 0° but less than 30° (FIGS. 9D, 9E). At the end of these steps, the cutting arms (5.4) reaches to 90° inside the full-size tobacco bale (B) as shown in FIG. 10, and the tobacco bale (B) is separated into the upper tobacco bale (C) and lower tobacco bale (D) as shown in FIG. 11.

The process of dividing the tobacco bale (B) into two halves is carried out through the gradual rotational movement of the cutting arms (5.4) and the repeated up and down separating movements of the main carrier system (5.3). While these processes continue, the counter pressure plate (5.6) continues to remain over the upper section and applies gentle pressure. This way, the upper tobacco bale (C) between the dividing arms (5.4) and the counter pressure plate (5.6) can be separated from the lower tobacco bale (D) without any deformation, de-shaping or loss firmness. Thanks to this gradual separation process of the full-size tobacco bale (B), the dividing/separating process operates more stably and the equipment used can have much longer lifetimes as they are mechanically stressed less.

In the invention, the most important aspect is the movement of the dividing arms (5.4) that enables the separation of the full-size tobacco bale (B). The cutting arms (5.4) are associated with the shafts in such a way that they can rotate on the vertical axis of the main carrier system table (5.2). Thus, the dividing arms (5.4) proceeds step by step by rotating from 0° to 90° inside the full-size tobacco bale (B). The length of the cutting arms (5.4) is designed to be shorter than half the width of the full-size tobacco bale (B). There are two reasons for this. The first is to prevent the cutting arms (5.4) to hitting to each other during their rotation, and the second is to reduce the moment force required for rotation. Additionally, the length of the cutting arms (5.4) in the middle section is slightly bigger than the other cutting arms (5.4). This prevents the collapse of the middle section of the full-size tobacco bale (B). This situation can be observed in FIG. 10.

Figure 11:
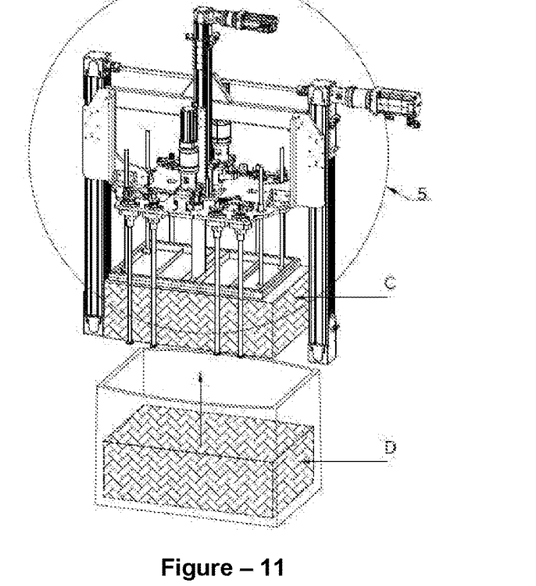
FIG. 11; The visual is of the divided upper tobacco bale, held in between the dividing arms that rotated a full 90° turn and how system and this section is moved up together with the main carriage unit.

In FIG. 11, the lower tobacco bale (D) remaining in the case (A) is seen, while the upper tobacco part (C) moved up by the tobacco bale dividing robot (5) is shown.

Figure 12:
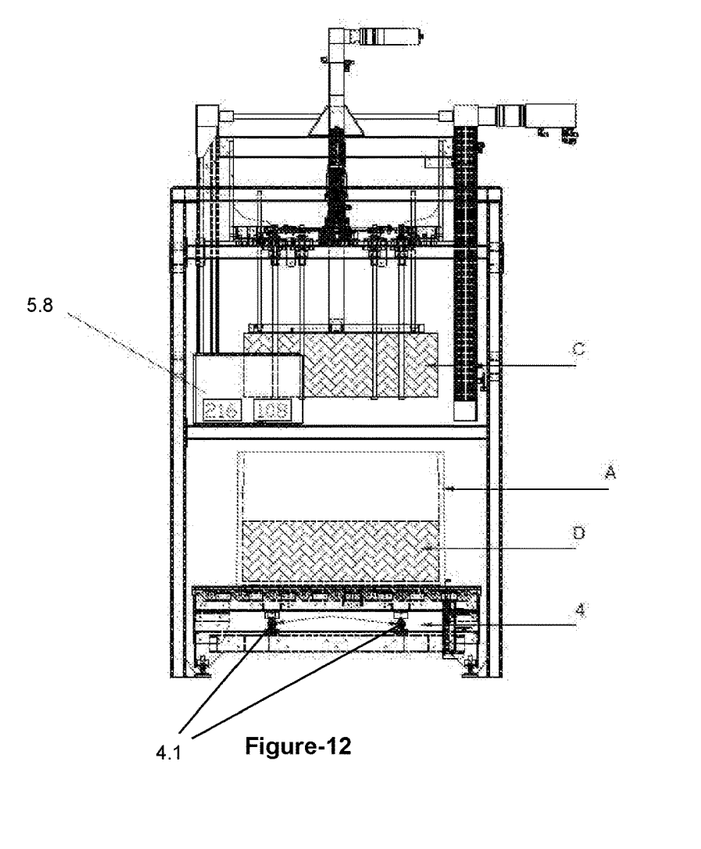
FIG. 12; The visual shows how the remaining half bale inside original case is measured in weight to check division accuracy & process control before next step.

In FIG. 12, in order to verify that the two half tobacco bales (C, D) after dividing process are divided equally, there is additionally feature over fourth conveyor (4) a weight measurement unit (4.1) that measures the lower tobacco bale (D) in the case (A), and the weight result is displayed on the weight indicator (5.8) and this data is electronically checked to confirm that the process is completed within tolerances by controlling the input-output weights.

Figure 13:
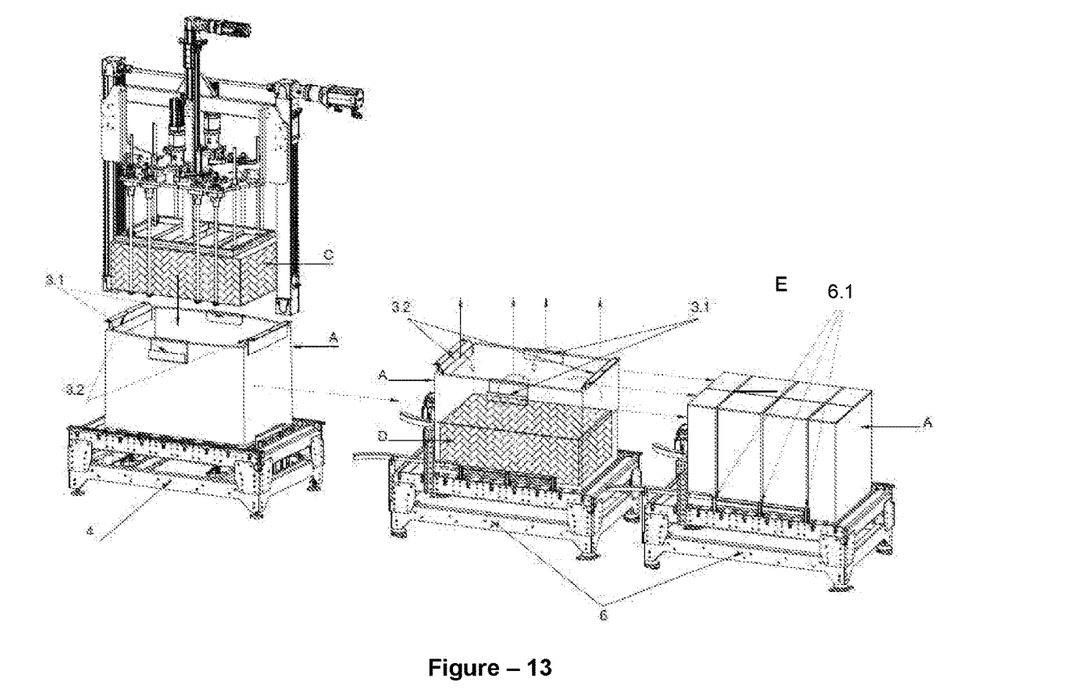
FIG. 13; The visual shows how weight controlled half tobacco bale is taken out of robot area, where side flaps closing and strapping activities are handled manually in order to ensure process completion & case rigidity purpose.

In FIG. 13, the tobacco bale dividing robot (5) process is completed as it is holding the upper tobacco bale (C) and the bottom tobacco bale (D) inside the box (A) is transferred to the fifth conveyor (6). After this step, the long side holding devices (3.1) and short side holding parts (3.2) of the box (A) are removed by the operator, the flaps of the case are closed, and after tightening of the strips (E), the case is transferred to the sixth conveyor (7) and seventh conveyor (8) which are defined in the process as system unloading conveyors. The strip channels (6.1) on the fifth conveyor (6) allow the operator to easily tie up the strips (E) of the box (A).

Figure 14:
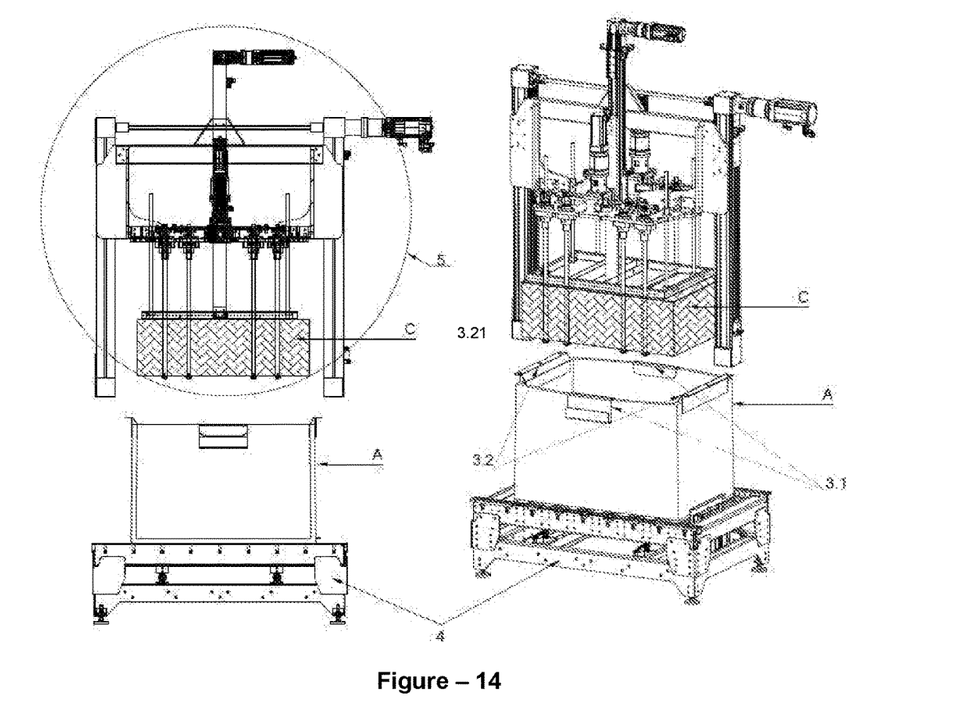
FIG. 14; The visual shows the position where the next/ empty case top lids are folded and transferred underneath dividing robot arms.

In FIG. 14, it is shown that while the operations of the case (A) containing the bottom tobacco bale (D) are completed, another empty case (A) has arrived onto the fourth conveyor (4). The flaps of this empty case (A) are opened, and the long & short sides flaps holding items (3.2 & 3.2) are already positioned by the operator. As in the previous steps, the case long-side opening system (5.1) stretches the long sides of the empty cases (A) by applying pulling force from the case long side holding items (3.1), and the tobacco bale dividing robot (5) travels downwards and places the upper tobacco bale (C) into the empty box (A).

Figure 15:
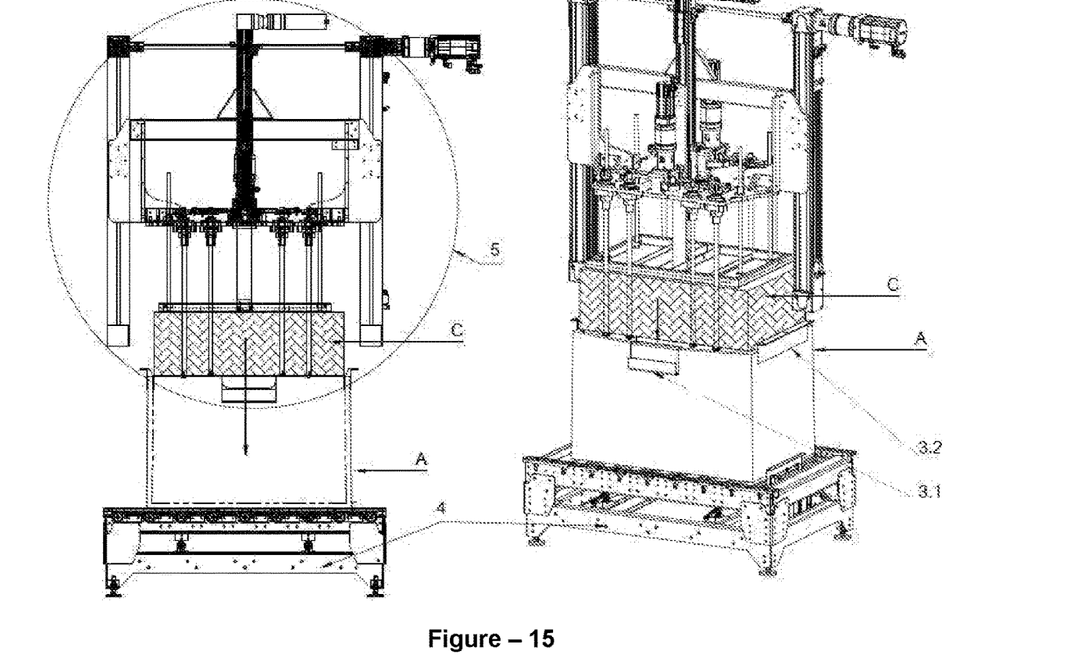
FIG. 15; The visual shows that how the divided upper tobacco bale piece is entered into empty box.
Figure 16:
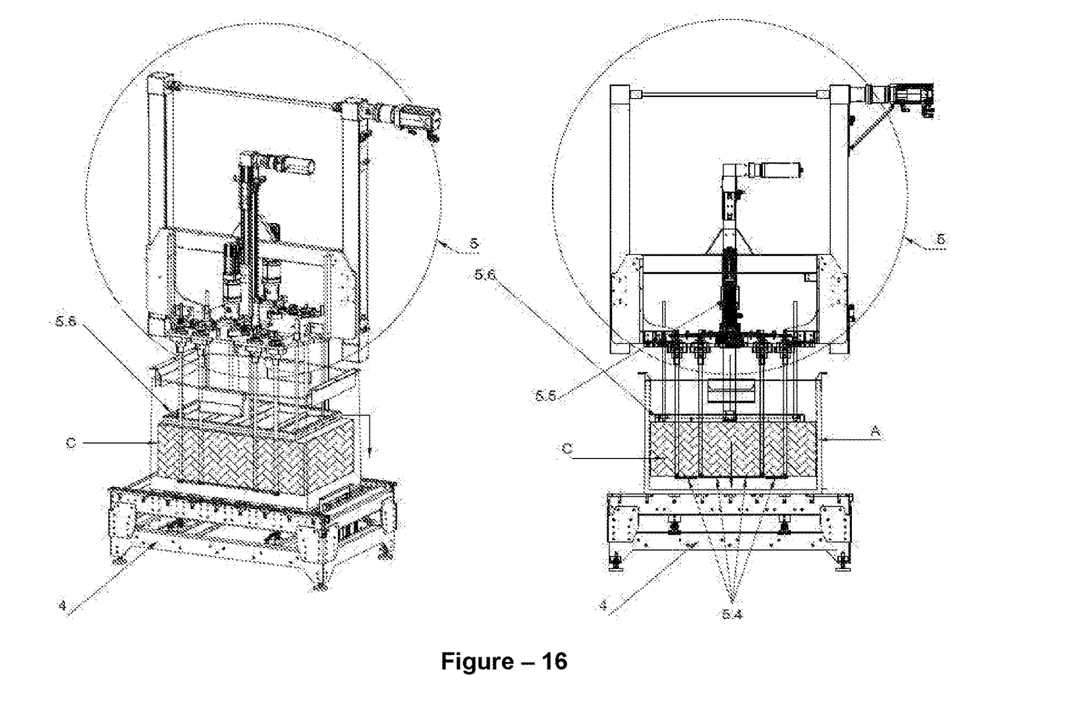
FIG. 16; The visual shows the opening of the dividing/ rotating arms, after properly positioned inside the empty box.

In FIGS. 15 and 16, it is shown that how the upper tobacco bale (C) advances into the empty box (A) and how the slope (3.21) in the box short side holding parts (3.2) allows this upper tobacco bale (C) slides easily into the box (A) without any shape deformation.

Figure 17:
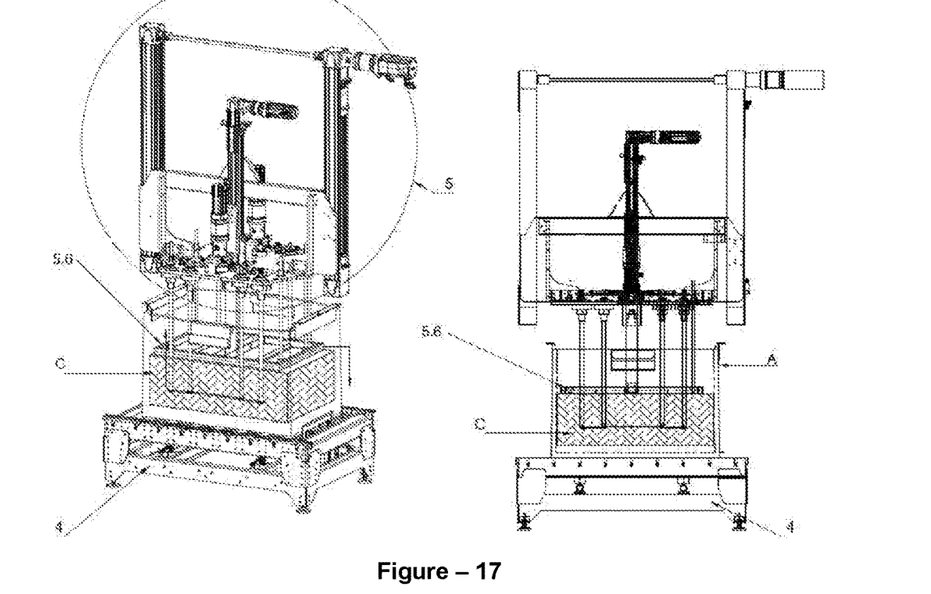
FIG. 17; The visual shows how the divided section of tobacco bale is released into empty case while robot is moving upwards; and counter balance plate moves downwards that, ensures half tobacco bale is properly placed inside.
Figure 18:
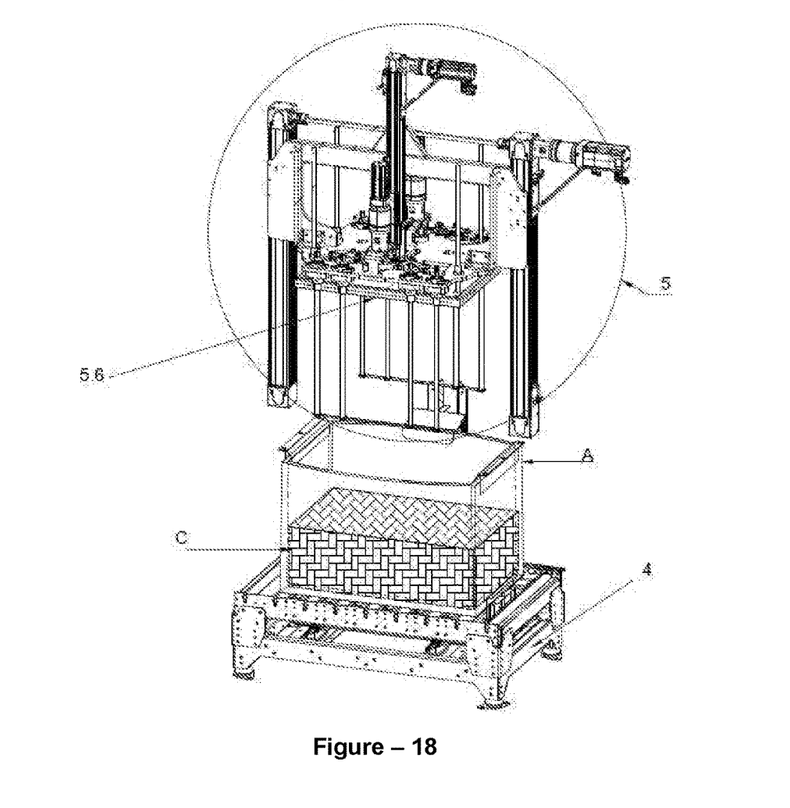
FIG. 18; The visual shows how complete robotic system is moved, upwards once properly releases half bale into the case.

In FIGS. 17 and 18, after the upper tobacco bale (C) is placed into the case (A), the dividing arms (5.4) rotate to the 0° position, and the main dividing system table (5.2) rises to remove the dividing arms (5.4) from the case (A). At the same time, two parallel processes work together in order to ensure that the releasing tobacco bale remains in the case (A) without getting caught on the dividing arm blades (5.4) and without any tobacco pieces/blocks remains over these blades. For this purpose, the counter pressure plate (5.6)

moves downward with the equal speed in the opposite direction, ensuring the smooth separation of the tobacco bale from system.

While the dividing arms (5.4) move upwards, the air control valve (5.7) connected to the small holes on the frame of the counter pressure plate (5.6) blows low pressure air from all these holes to prevent the spread of tobacco small particles and dust into the workspace during this physical movement. As next, this case (A) carrying the upper tobacco bale (C) is closed in the same way on the fifth conveyor (6).

The strip channels (6.1) on the fifth conveyor (6) allow the operator to easily tie the box (A) via strips (E). With the invention, a tobacco bale (B) in a case (A) has been divided into two equal parts and both parts have been packaged in cases (A). The cases (A) are steady packaged over the fifth conveyor (6) are unloaded from the system via the sixth conveyor (7) and the seventh conveyor (8).

The invention claimed is:

1. A method for dividing and separating a full-size tobacco bale inside its own case by removing an upper half of the full-size tobacco bale across a horizontal width thereof, placing the upper half into an empty case and separating the full-size tobacco bale into two cases, the method comprising:
    positioning the case containing the full-size tobacco bale under a tobacco bale dividing robot;
    moving dividing arms of said tobacco bale dividing robot through side walls of the case and the tobacco bale by traveling downwardly in a vertical direction up to half of a height of the full-size tobacco bale;
    rotating the dividing arms gradually from 0° parallel to an elongated sided of the case to a 90° position perpendicular to the elongated side of the case;
    dividing the full-size tobacco bale by a horizontal rotation of the dividing arms; and
    vertically moving the dividing arm at the 90° position so as to separate the full-size tobacco bale into an upper tobacco bale and a lower tobacco bale.

2. The method of claim 1, further comprising:
    extracting the case by case opening arms so as to form a free space between the full-size tobacco bale and the case.

3. The method of claim 2, further comprising:
    positioning holding parts so as to hold the case.

4. The method of claim 3, wherein the holding parts are positioned so as to prevent bending the case.

5. The method of claim 1, wherein the step of rotating the dividing arms is performed in multiple steps.

6. The method of claim 5, wherein each of the multiple steps is between 0° to 30° in each step.

7. The method of claim 5, wherein the step of rotating the dividing arms comprises sequenced movement of the dividing arms upwards in an X direction and downward in a Y direction after one step of the multiple steps.

8. The method of claim 1, further comprising:
    transferring the case having a lower part of the full-size tobacco bale to a conveyor;
    removing all side flaps holding pieces;
    folding and closing side flaps of the case; and
    applying strips over the case.

9. The method of claim 1, further comprising:
    releasing the upper tobacco bale into a new case on a conveyor.

10. The method of claim 1, further comprising:
    applying pressure over the full-size tobacco bale by a counter-pressure plate.

* * * * *